United States Patent Office 3,124,695
Patented Mar. 10, 1964

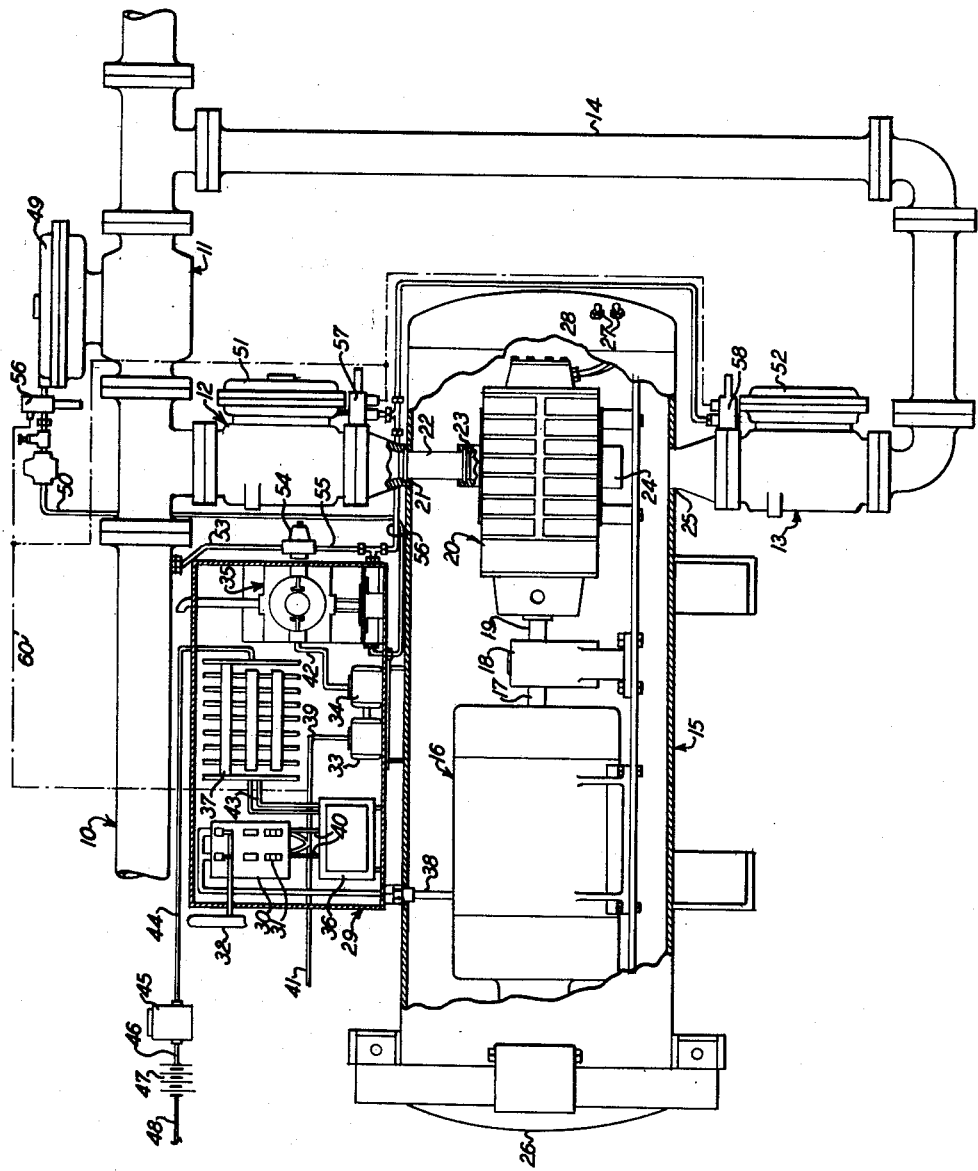

3,124,695
AUTOMATICALLY CONTROLLED FLUID PRESSURE OPERATED ELECTRIC POWER PLANTS
William H. Middleton and Marvin L. Hall, Houston, Tex., assignors to Jay L. Robison, Houston, Tex.
Filed Jan. 6, 1961, Ser. No. 81,023
5 Claims. (Cl. 290—40)

This invention relates to the generation of electric power and more particularly to an automatically controlled fluid pressure operated electric power plant.

In the oil and natural gas fields and particularly along the pipe lines leading from such fields, it is frequently desirable to have available a source of electric power for the operation of electrical equipment and in the case of pipe lines leading from off shore fields, such electric power is frequently utilized for the operation of signal lights, fog horns or other equipment. Since the locations in which such power is required are remote from normal sources of electric power, it is necessary to provide electric generating means at each location. Gasoline or diesel driven power plants are not practical for this purpose because of the necessity for frequent servicing, including the supply of fuel and furthermore, such installations are relatively costly.

Obviously the most practical source of power for such installations would be the fluid flowing through the pipe line and heretofore equipment has been developed for utilizing such power for the generation of electricity, but various disadvantages have arisen in connection with the use of such prior equipment, such as the introduction of excessive pressure drop in the pipe line, the failure to provide adequately regulated frequency and voltage output, the necessity for utilizing high pressure casings or housing for the fluid motor with the consequent danger of leaks, difficulty in servicing the equipment without adversely affecting pipeline operation and adverse effects on pipe line operation due to failure of the generating power plant or components thereof.

It is accordingly an object of this invention to provide an automatically controlled fluid pressure operated electric power plant which may be installed in a pipe line at any desired location and which will operate satisfactorily without in any way adversely effecting operating of the pipe line.

A further object of the invention is the provision of an automatically controlled fluid pressure operated electric power plant for installation in a pipe line, such power plant including an alternating current generator and a fluid operated motor for driving the same, the motor and generator being disposed in a fluid tight housing with the exhaust outlet from the motor opening into the housing whereby it is only necessary for the seals and housing of the motor to withstand the pressure drop to the motor.

A still further object of the invention is the provision of an automatically controlled fluid pressure operated electric power plant for installation in a pipe line, the power plant including an alternating current generator and a fluid operated motor, together with means for regulating the output and frequency of the generator.

Another object of the invention is the provision of an automatically controlled fluid pressure operated electric power plant for installation in a pipe line, the power plant including an alternating current generator and a fluid motor, there being a step-down transformer connected to the output of the generator and to a rectifier which in turn charges a storage battery, the output from the storage battery being utilized to operate a load upon failure of the generating system.

A further object of the invention is the provision of an automatically controlled fluid pressure operated electric power plant, the power plant including an alternating current generator and a fluid motor, there being a throttle valve for installation in the pipe line, the operation of the throttle valve being controlled by the output of the generator to control the speed of the fluid motor and the throttle valve automatically moving to full open position upon stoppage of the generator.

A still further object of the invention is the provision of an automatically controlled fluid pressure operated electric power plant, the power plant including an alternating current generator and a fluid motor, there being a throttle valve for installation in a pipe line and inlet and return valves connected to the pipe line on opposite sides of the throttle valve, the inlet and return valves being normally held open by fluid pressure and automatically closing upon stoppage of the generator in order to isolate the fluid motor from the pipe line when the motor and generator are inoperative.

Further objects and advantages of the invention will be apparent from the following description taken in conjunction with the accompanying drawing wherein:

The single figure of the drawing is an elevational view with parts broken away and in section for greater clarity and showing an electric power plant constructed in accordance with this invention and the manner of installing the same in a pipe line.

With continued reference to the drawing, there is shown an automatically controlled fluid pressure operated electric power plant for installation in a pipe line 10 and for the purpose of utilizing the power available from the fluid flowing through the pipe line 10 there is provided a throttle valve 11 for installation in the pipe line 10 and an inlet valve 12 for connection to the pipe line 10 upstream from the throttle valve 11 and a return valve 13 which is connected through a conduit 14 to the pipe line 10 downstream from the throttle valve 11.

Mounted within a fluid tight housing 15 is an alternating current generator 16 and the rotor shaft 17 of the generator 16 is connected through a suitable coupling 18 to the power output shaft 19 of a fluid motor 20. The inlet valve 12 is connected through a fluid tight seal 21 in the housing 15 with a pipe 22 which in turn connects to the inlet 23 of the motor 20. The exhaust outlet 24 of the motor 20 opens into the housing 15. The return valve 13 connects at 25 to the interior of the housing 15 and fluid within the housing 15 is returned to the pipe line 10 through the return valve 13 and conduit 14 in a manner to be later described. The housing 15 is provided with a removable end closure 26 which may be secured to the housing 15 in fluid tight relation and which may be removed to permit convenient removal of the generator 16 or motor 20 for replacement or servicing thereof. In order to provide for proper lubrication of the motor bearing there may be provided grease fittings 27 on the exterior of the housing 15 and such grease fittings 27 may be connected through suitable conduits 28 with the bearings of the motor 20.

Mounted on the housing 15 is a housing 29 for the control components of the apparatus and disposed within the housing 29 is a main switch 30 provided with suitable fuses 31 and manually operable means 32 disposed exteriorly of the housing 29 for operating the switch 30. Also disposed within the housing 29 is a synchronous motor 33, a tachometer generator 34 driven by the motor 33 and an electrically controlled fluid pressure regulator 35, a step down transformer 36 and a rectifier 37. The electrical output of the alternating current generators 16 is connected through a suitable conductor 38 to the main switch 30 and from the main switch 30 a conductor 39 connects to the synchronous motor 33, other conductors 40 connect from the switch 30 to the step down transformer 36 and a conductor 41 is connected from the switch 30 to the load to be operated by the power plant which may be signal lights, fog horns or other electrical equipment. The output of the tachometer generator 34 is connected through a conductor 42 to the fluid pressure regulator 35 and the output of the step down transformer 36 is connected through conductors 43 to the rectifier 37 the output of which is connected through a conductor 44 to a voltage regulator 45 and in turn through a conductor 46 to a storage battery 47, the output of which may be connected through a conductor 48 to a load comprising electrical equipment to be operated.

The throttle valve 11 is provided with a fluid pressure operated actuator 49 and such actuator is connected through a suitable conduit 50 with the fluid pressure regulator 35. In a similar manner, the inlet valve 12 is provided with a fluid pressure operated actuator 51 and the return valve 13 is provided with a fluid pressure operated actuator 52. A conduit 53 is connected to the pipe line 10 upstream from the throttle valve 11 and the conduit 53 connects to a manually operated fluid pressure regulator 54 which in turn is connected through a conduit 55 with the electrically controlled fluid pressure regulator 35 and through a conduit 56 with the actuator 51 for the inlet valve 12 and the actuator 52 for the return valve 13.

The fluid pressure actuator 49 for the throttle valve 11 is provided with solenoid means 56 which upon de-energization causes the throttle valve 11 to fully open and likewise, the actuator 51 for the inlet valve 12 and the actuator 52 for the return valve 13 are provided with solenoid means 57 and 58 respectively which, upon de-energization cause the inlet valve 12 and the return valve 13 to close. The solenoid means 57 and 58, as well as the solenoid means 56 are connected through solenoid conductors 59 and 60 with the electrical output of the alternating current generator 16, whereby during operation of the generator 16, the solenoids 56, 57 and 58 are energized and upon stoppage of the generator 16, the solenoids 56, 57 and 58 become de-energized.

In the operation of the power plant of this invention the throttle valve 11 in the pipe line 10 is partially closed to provide a pressure differential between the upstream side of the throttle valve 11 and the downstream side thereof and as a result, pressure fluid will flow through the inlet valve 12 and the inlet 22 into the motor 20 causing operation of the same to drive the alternating current generator 16. The exhaust fluid from the motor 20 will flow through the exhaust 24 into the interior of the housing 15 thereby providing a positive pressure within the housing with the result that the only pressure to which the casing and seals of the motor 20 is subjected is the pressure drop necessary to operate the motor 20. By reason of this fact, relatively low pressure seals and housing may be provided for the motor 20 thereby reducing the cost thereof, as well as maintenance problems due to leakage of seals or housing. The fluid exhausted into the housing 15 is returned to the pipe line 10 on the downstream side of the throttle valve 11 through the return valve 13 and conduit 14.

The synchronous motor 33 is driven by the electrical output of the alternating current generator 16 and, of course, the speed of the synchronous motor 33 is directly proportional to the frequency of the electrical output of the alternating current generator 16. As a result, the electrical output of the tachometer generator 34 which is driven by the synchronous motor 33 is also proportional to the output of the alternating current generator 16. The electrical output of the tachometer generator 34 controls the operation of the electrically controlled fluid pressure regulator 35 which in turn controls the operation of the fluid pressure actuator 49 for the throttle valve 11 and consequently, such throttle valve is operated in such a manner as to maintain the frequency and voltage output of the alternating current generator 16 constant, regardless of fluctuating in pressure within the pipe line 10 and also regardless of load conditions imposed on the alternating current generator 16. During normal operation of the power plant, the solenoids 56, 57 and 58 are energized by reason of their connection to the electrical output of the alternating current generator 16 and as a consequence, the fluid pressure actuator 49 operates to control operation of the throttle valve 11 and the fluid pressure actuators 51 and 52 maintain the inlet valve 12 and return valve 13 respectively in open condition. Upon stoppage of the alternating current generator 16 for any reason, the solenoids 56, 57 and 58 will become de-energized resulting in opening of the throttle valve 11 which provides for free flow of fluid through the pipe line 10 and likewise, the inlet valve 12 and return valve 13 will be closed which serves to completely isolate the power plant from the pipe line 10 thereby in no way interfering with the normal operation of the pipe line and also permitting repair or other service operations on the power plant completely independently of the operation of the pipe line 10. During periods of stoppage of the power plant, the storage battery 47 which is maintained in a fully charged condition by the power plant during operation thereof will serve to provide a source of power for auxiliary electrical equipment, such as signal lights or fog horns and upon resumption of operation of the power plant, the output of the alternating current generator 16 will take over the electrical load.

It will be seen that by the above described invention there has been provided a relatively simple power plant which may be installed in pipe lines at points remote from normal electric power sources and also a power plant which will automatically operate for long periods of time without attention or service and which is automatically controlled to provide a regulated voltage output and frequency. Furthermore, the power plant incorporates means to provide an auxiliary source of electric power in the event of failure of the power plant for any reason whatsoever and also failure or stoppage of the power plant will in no way interfere with normal operations of the pipe line in which the same is installed thereby permitting normal operation of the pipe line and also service or repair to the power plant without in any way interfering with normal operation of the pipe line.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. An automatically controlled fluid pressure operated electric power plant comprising a throttle valve for installation in a fluid pressure conduit to throttle flow of fluid through the conduit, a fluid inlet valve for connection to said conduit upstream from said throttle valve, a fluid return valve for connection to said conduit downstream from said throttle valve, a fluid tight housing, an alternating current generator mounted in said housing, a fluid motor for driving said generator mounted in said housing, said inlet valve being connected to the inlet of said motor, the exhaust outlet of said motor being open into said housing, said return valve being connected to said housing, a synchronous motor connected to the output of said generator, means for connecting the output of said generator to a load, a tachometer generator driven by said synchronous motor, an electrically controlled fluid pressure regulator connected to said tachometer generator, a fluid pressure operated actuator for said throttle valve, means connecting said actuator and said regulator, a fluid pressure operator inlet valve actuator, a fluid pressure operated return valve actuator, means for connection to said conduit upstream from said throttle valve for supplying fluid pressure to said regulator and to said inlet valve and return valve actuators, whereby upon partial closing of said throttle valve fluid pressure from said conduit will open said inlet and return valves to cause operation of said motor and generator, the output of said tachometer generator controlling said regulator and thereby controlling said throttle valve to maintain the speed of said motor constant, solenoid means for opening said throttle valve and for closing said inlet and return valves, means connecting said solenoid means and the output of said generator, whereby upon stoppage of said motor said throttle valve will open and said inlet and return valves close, a step down transformer connected to the output of said generator, a rectifier connected to the output of said transformer, a voltage regulator connected to the output of said rectifier, a storage battery connected to said voltage regulator and means connecting said battery to a load, whereby operation of said generator will charge said battery and upon stoppage of said motor said battery will supply current to said last named load.

2. An automatically controlled fluid pressure operated electric power plant comprising a throttle valve for installation in a fluid pressure conduit to throttle flow of fluid through the conduit, a fluid inlet valve for connection to said stream from said throttle valve, a fluid return valve for connection to said conduit downstream from said throttle valve, a fluid tight housing, an alternating current generator mounted in said housing, a fluid motor for driving said generator mounted in said housing, said inlet valve being connected to the inlet of said motor, the exhaust outlet of said motor being open into said housing, said return valve being connected to said housing, a synchronous motor connected to the output of said generator, means for connecting the output of said generator to a load, a tachometer generator driven by said synchronous motor, an electrically controlled fluid pressure regulator connected to said tachometer generator, a fluid pressure operated actuator for said throttle valve, means connecting said actuator and said regulator, a fluid pressure operated inlet valve actuator, a fluid pressure operated return valve actuator, means for connection to said conduit upstream from said throttle valve for supplying fluid passage to said regulator and to said inlet valve and return valve actuator, whereby upon partial closing of said throttle valve fluid pressure from said conduit will open said inlet and return valve to cause operation of said motor and generator, the output of said tachometer generator controlling said regulator and thereby controlling said throttle valve to maintain the speed of said motor constant and solenoid means for opening said throttle valve and for closing said inlet and return valves, means connecting said solenoid means and the output of said generator, whereby upon stoppage of said motor said throttle valve will open and said inlet and return valve close.

3. An automatically controlled fluid pressure operated electric power plant comprising a throttle valve for installation in a fluid pressure conduit to throttle flow of fluid through the conduit, a fluid inlet valve for connection to said conduit upstream from said throttle valve, a fluid return valve for connection to said conduit downstream from said throttle valve, a fluid tight housing, an alternating current generator mounted in said housing, a fluid motor for driving said generator mounted in said housing, said inlet valve being connected to the inlet of said motor, the exhaust outlet of said motor being open into said housing, said return valve being connected to said housing, a synchronous motor connected to the output of said generator, means for connecting the output of said generator to a load, a tachometer driven by said synchronous motor, an electrically controlled fluid pressure regulator connected to said tachometer generator, a fluid pressure operated actuator for said throttle valve, means connecting said actuator and said regulator, a fluid pressure operated inlet valve actuator, a fluid pressure operated return valve actuator, means for connection to said conduit upstream from said throttle valve for supplying fluid pressure to said regulator and to said inlet valve and return valve actuator, whereby upon partial closing of said throttle valve fluid pressure from said conduit will open said inlet and return valves to cause operation of said motor and generator, the output of said tachometer generator controlling said regulator and thereby controlling said throttle valve to maintain the speed of said motor constant and means for opening said throttle valve and for closing said inlet and return valves upon stoppage of said motor.

4. An automatically controlled fluid pressure operated electric power plant comprising a throttle valve for installation in a fluid pressure conduit to throttle flow of fluid through the conduit, a fluid inlet valve for connection to said conduit upstream from said throttle valve, a fluid return valve for connection to said conduit downstream from said throttle valve, an alternating current generator, a fluid motor for driving said generator, said inlet valve being connected to the inlet of said motor, the exhaust outlet of said motor being connected to said return valve, a synchronous motor connected to the output of said generator, means for connecting the output of said generator to a load, a tachometer generator driven by said synchronous motor, an electrically controlled fluid pressure regulator connected to said tachometer generator, a fluid pressure operated actuator for said throttle valve, means connecting said actuator and said regulator, a fluid pressure operated inlet valve actuator, a fluid pressure operated return valve actuator, means for connection to said conduit upstream from said throttle valve for supplying fluid pressure to said regulator and to said inlet valve and return valve actuators, whereby upon partial closing of said throttle valve fluid pressure from said conduit will open said inlet and return valve to cause operation of said motor and generator, the output of said tachometer generator controlling said regulator and thereby controlling said throttle valve to maintain the speed of said motor constant and means for opening said throttle valve and of closing said inlet and return valves upon stoppage of said motor.

5. An automatically controlled fluid pressure operated electric power plant comprising a throttle valve for installation in a fluid pressure conduit to throttle flow of fluid through the conduit, a fluid inlet valve for connection to said conduit upstream from said throttle valve, a fluid return valve for connection to said conduit downstream from said throttle valve, an alternating current generator, a fluid motor for driving said generator, said inlet valve being connected to the inlet of said motor, the exhaust outlet of said motor being connected to said return valve, a synchronous motor connected to the output of said generator, means for connecting the output of said generator to a load, a tachometer generator driven by said synchronous motor, an actuator for said throttle valve, means connecting said actuator and said tachometer generator, an inlet valve actuator, a return valve actuator, means for operating said actuators, whereby upon partial closing of said throttle valve fluid pressure from said conduit will cause operation of said motor and generator, the output of said tachometer generator controlling said throttle valve to maintain the speed of said motor constant and means for opening said throttle valve and for closing said inlet and return valves upon stopping of said motor.

References Cited in the file of this patent

UNITED STATES PATENTS

| | | |
|---|---|---|
| 1,704,403 | Nash | Mar. 5, 1929 |
| 2,790,092 | Guth | Apr. 23, 1957 |
| 2,938,527 | Nichols | May 31, 1960 |